Sept. 4, 1956
M. T. EUSTIS
2,761,353
TENSIONING DEVICE FOR SPECTACLE FRAMES
Filed March 9, 1953
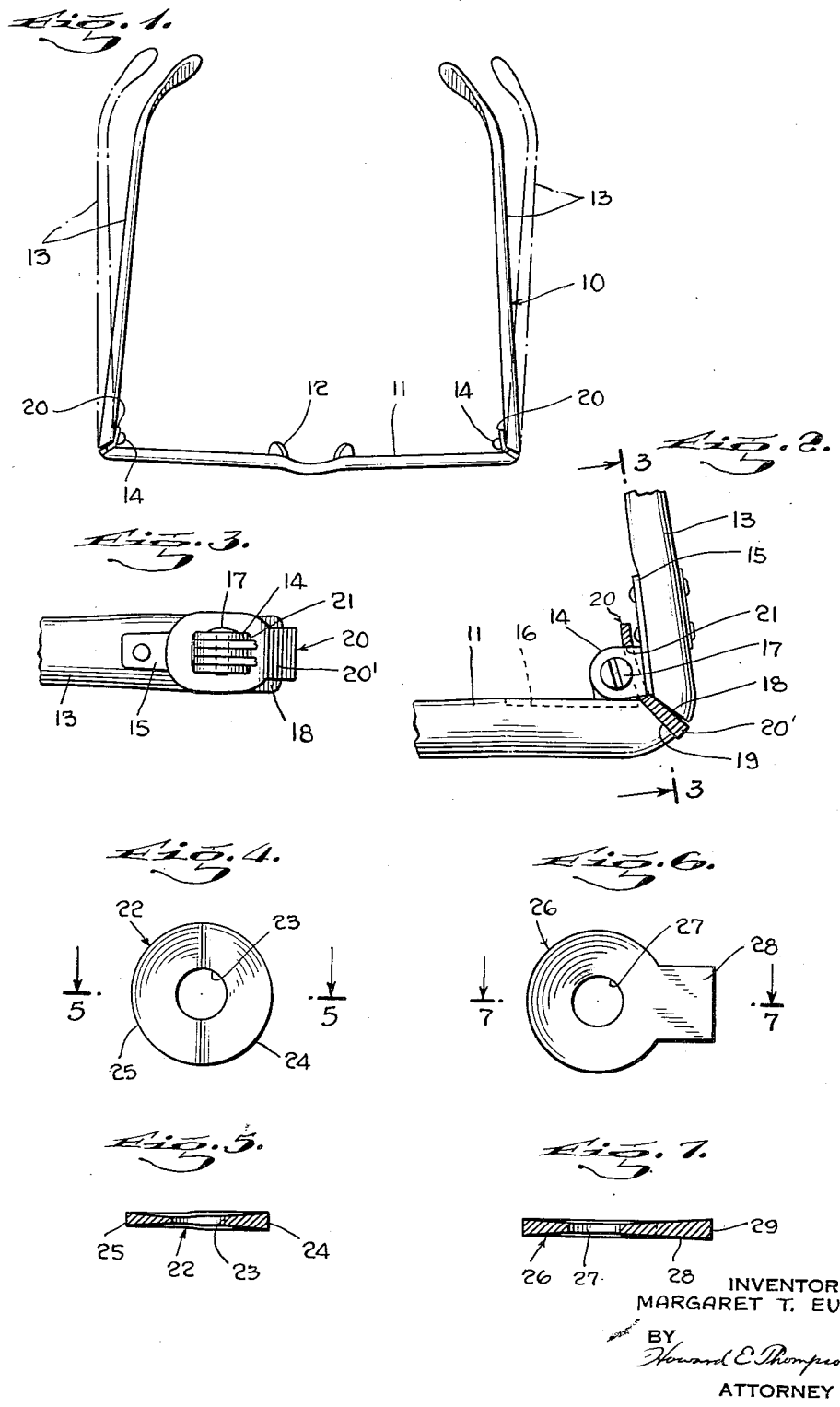
INVENTOR
MARGARET T. EUSTIS
BY
Howard E. Thompson Jr
ATTORNEY United States Patent Office 2,761,353
Patented Sept. 4, 1956

2,761,353

TENSIONING DEVICE FOR SPECTACLE FRAMES

Margaret T. Eustis, New Rochelle, N. Y.

Application March 9, 1953, Serial No. 341,156

4 Claims. (Cl. 88—53)

This invention relates to tensioning devices for spectacle frames and more particularly to the frames of spectacles of the so-called "horn rim" type. More particularly, the invention relates to detachable resilient devices adapted to be arranged at the hinge or pivot portion of spectacle frames of the "horn rim" type for yieldably tensioning the bow or temple members thereof.

In spectacles of the "horn rim" type wherein the eye glass frames and the bows or temples are fashioned from plastic materials and the like, it is customary to provide in the eye glass frame and in the temples interfitting pivot portions of metal for pivotally coupling the parts together. This type of construction does not have the flexibility in the bow or temple parts which characterizes all metal frames, and properly fitting the wearer generally requires the bending or reforming of the bow or temple parts with careful and proper application of heat. While this can readily be done by those skilled in the art of fitting spectacles, it is difficult for the average individual to make such adjustments. There are may instances therefore, in which the wearers of the "horn rim" type of spectacles are going about from day to day without proper fitting of the bow or temple parts, the primary difficulty being that these parts do not engage the head firmly enough to properly support the spectacles.

An object of my invention is to provide a tensioning device for spectacle frames which can readily be attached or detached and which can be mounted on conventional spectacle frames of the "horn rim" type without interference with the design or appearance thereof. A further object is to provide a tensioning device of the character described which is resilient in nature and which when mounted at the hinge portion of the spectacle frames of the "horn rim" type will insure firm, yieldable engagement between the bows or temples and the head of the wearer.

These and other objects of the invention will best be understood from a consideration of the following description taken together with the accompanying drawing showing certain adaptations of my invention, in which the various details thereof are identified by suitable reference characters in each of the views, and in which:

Fig. 1 is a top plan view of a pair of spectacles showing one form of my tensioning device mounted at the hinge portions thereof;

Fig. 2 is an enlarged fragmentary view of the construction as shown in Fig. 1 with the tensioning device shown in section;

Fig. 3 is a view subtsantially on the line 3—3 of Fig. 2 showing a portion of the bow or temple part and the hinge portion thereof with one of my tensioning devices in position around said hinge portion;

Fig. 4 is a plan view of a second form of tensioning device in accordance with my invention;

Fig. 5 is a sectional view substantially on the line 5—5 of Fig. 4;

Fig. 6 is a plan view of a third form of tensioning device in accordance with my invention; and Fig. 7 is a view substantially on the line 7—7 of Fig. 6.

For purpose of illustration I have shown in Fig. 1 of the drawing a typical spectacle frame 10 of the "horn rim" type having an eye glass frame 11 including a nose bridge portion 12 and two bows or temples 13 which are pivoted to the eye glass frame 11 by means of hinges 14.

As more clearly shown in Figs. 2 and 3, the hinges 14 comprise interfitting metal parts 15 and 16 riveted or otherwise secured to the bow 13 and eye glass frame 11 respectively and secured together by means of a screw 17. It will be noted that the end of the temple 13 adjacent the hinge 14 is beveled as indicated at 18 to register with another beveled portion 19 on the eye glass frame 11 to thereby provide a stop means normally limiting pivotal movement of the bow 13 with respect to the eye glass frame.

In Figs. 1 to 3 of the drawing I have shown one form of my tensioning device 20 as arranged on the spectacle frame at the hinge portion thereof. It will be noted that the tensioning device 20 comprises a body of resilient material of relatively thin wall structure having an aperture therein as indicated at 21 in Figs. 2 and 3 which permits sliding the tensioning device 20 over the bow 13 and arrangement on the hinge 14 to envelop the same in the manner indicated. The portion of the device 20 which falls between the normally abutting surfaces 18, 19 of the frame parts serves as a resilient stop member and normally supports the bow 13 in an inwardly flexed position as indicated in the full lines in Fig. 1 of the drawing, whereas without the tensioning device 20, the bow 13 would assume the position substantially as shown in the dot and dash lines in Fig. 1. Movement of the bows 13 from the full line to the dotted line positions as shown in Fig. 1 requires increasing force or pressure as the material of the tensioning device 20 is compressed. Intermediate the full line and dotted line positions of the temple as shown in Fig. 1, however, the tensioning device 20 will insure a firm, yieldable engagement between the bows and the head of the wearer.

The tensioning device 20 may in its simplest form comprise merely a washer-like body of rubber or other suitable resilient material of relatively thin wall structure and having an aperture 21 as indicated in Figs. 2 and 3 for mounting the same. In preferred adaptations of my tensioning device, however, I provide means for adjusting the device to permit different degrees of tension in the bows 13. By way of illustration, I have shown in Figs. 4 and 5 of the drawing a variable tensioning device 22 comprising a body of resilient material having an aperture 23 therein. One portion 24 of the device 22 is of greater thickness than the other portion 25 thereof and in each of the portions 24 and 25 it will be noted that the wall thickness adjacent the aperture 23 is somewhat less than the wall thickness at the periphery of the device.

With the construction as shown in Figs. 4 and 5, it will be apparent that if the portion 24 is arranged between surfaces 18 and 19 of a spectacle frame a greater tensioning and inward displacement of the bow 13 will be provided than if the thinner portion 25 of the device is arranged between surfaces 18 and 19. Thus, by properly orienting the device 22 with respect to the hinge portion of a spectacle frame, the wearer can readily select either of two possible degrees of tension provided by the device. It will be noted in this connection that the division of the device into two different sections is merely for purpose of illustration and it is within the scope of my invention to provide three or four such divisions, each of different thickness if it is desired to provide a greater range of selectivity and tension adjustment.

In Figs. 6 and 7 I have indicated a further means for varying the tension provided in the use of my tensioning device. In this modification the main portion of the device 26 is of generally uniform thickness about the periphery thereof and is tapered inwardly toward the aperture 27 therein in the manner previously described. A portion of the periphery, however, extends outwardly in a tab 28 having a taper generally continuous with the taper above mentioned to provide at the end 29 thereof a thickness somewhat greater than the maximum thickness of the main portion 26 of the device. It will be noted that when the tab 28 is arranged between the frame surfaces 18 and 19 in the manner shown in Figs. 2 and 3 of the drawing, the greater volume of resilient material disposed between the surfaces 18 and 19 will provide a tension considerably greater than if the the tab 28 is disposed on the reverse side of the hinge 14 and the main body 26 of the device is disposed between the frame surfaces 18 and 19.

It will be understood, of course, that the features disclosed in Figs. 4 and 5 and those disclosed in Figs. 6 and 7 can be combined in a single tensioning device. Thus, for example, the two portions 24 and 25 as shown in Figs. 4 and 5 could each be provided with a protruding tab substantially as shown at 28 in Figs. 6 and 7. If more than one such protruding tab is employed, however, they are preferably arranged at diametrically opposed positions so as to present no protruding parts when the device is mounted on a spectacle frame. In this connection attention is directed to the showing in Fig. 3 wherein a single projecting tab 20' is substantially within the limits of the beveled surface 18 of the bow 13 and is thus substantially concealed from view. A second tab 20' in a diametrically opposed position would similarly be concealed from view behind the bow 13 and hinge part 15 thereof. It will also be noted that the dimensions from the aperture to the periphery of the main portion of any of the devices 20, 22 and 26 will be sufficiently small so that when stretched to envelop the hinge 14 these portions will closely engage the hinge and will not protrude to any appreciable extent beyond the upper and lower surfaces of the bow 13 (note Fig. 3 of the drawing).

Various changes and modifications in the tensioning device herein disclosed may occur to those versed in the art, and to the extent that such changes and modifications are embraced by the appended claims, it is to be understood that they constitute part of my invention.

I claim:
1. A detachable tensioning device for spectacle frames of the "horn rim" type having pivotally coupled eye glass frame and bow parts with bearing surfaces on said parts adjacent the hinge therebetween for limiting pivotal movement of said bow parts, said device comprising an essentially circular thin body of elastic material having a large central aperture therein adapted to envelop said hinge in a manner to dispose a portion of said device for compression between said bearing surfaces, said device being sufficiently elastic to permit attachment and detachment thereof by enlargement of the aperture therein to slide over a bow part into enveloping engagement with said hinge, and opposed surfaces of said body being convergent toward the center thereof to provide a lesser wall thickness adjacent said aperture than at the periphery of said body.

2. A detachable tensioning device for spectacle frames of the "horn rim" type as defined in claim 1 wherein the dimensions of said body in separate zones circumferentially thereof are varied in a manner to provide different compressibility in said separate zones.

3. A detachable tensioning device for spectacle frames of the "horn rim" type as defined in claim 2 wherein the dimension varied in said separate zones is the thickness of said body.

4. A detachable tensioning device for spectacle frames of the "horn rim" type as defined in claim 2 wherein the dimension varied in said separate zones is the distance from said aperture to the periphery of said body.

References Cited in the file of this patent
UNITED STATES PATENTS

| | | |
|---|---|---|
| 2,026,723 | Wollensak | Jan. 7, 1936 |
| 2,145,307 | Hunt | Jan. 31, 1939 |
| 2,652,747 | Maleck | Sept. 22, 1953 |
| 2,684,014 | Fairly | July 20, 1954 |

FOREIGN PATENTS

| | | |
|---|---|---|
| 162,502 | Switzerland | Sept. 1, 1933 |